UNITED STATES PATENT OFFICE.

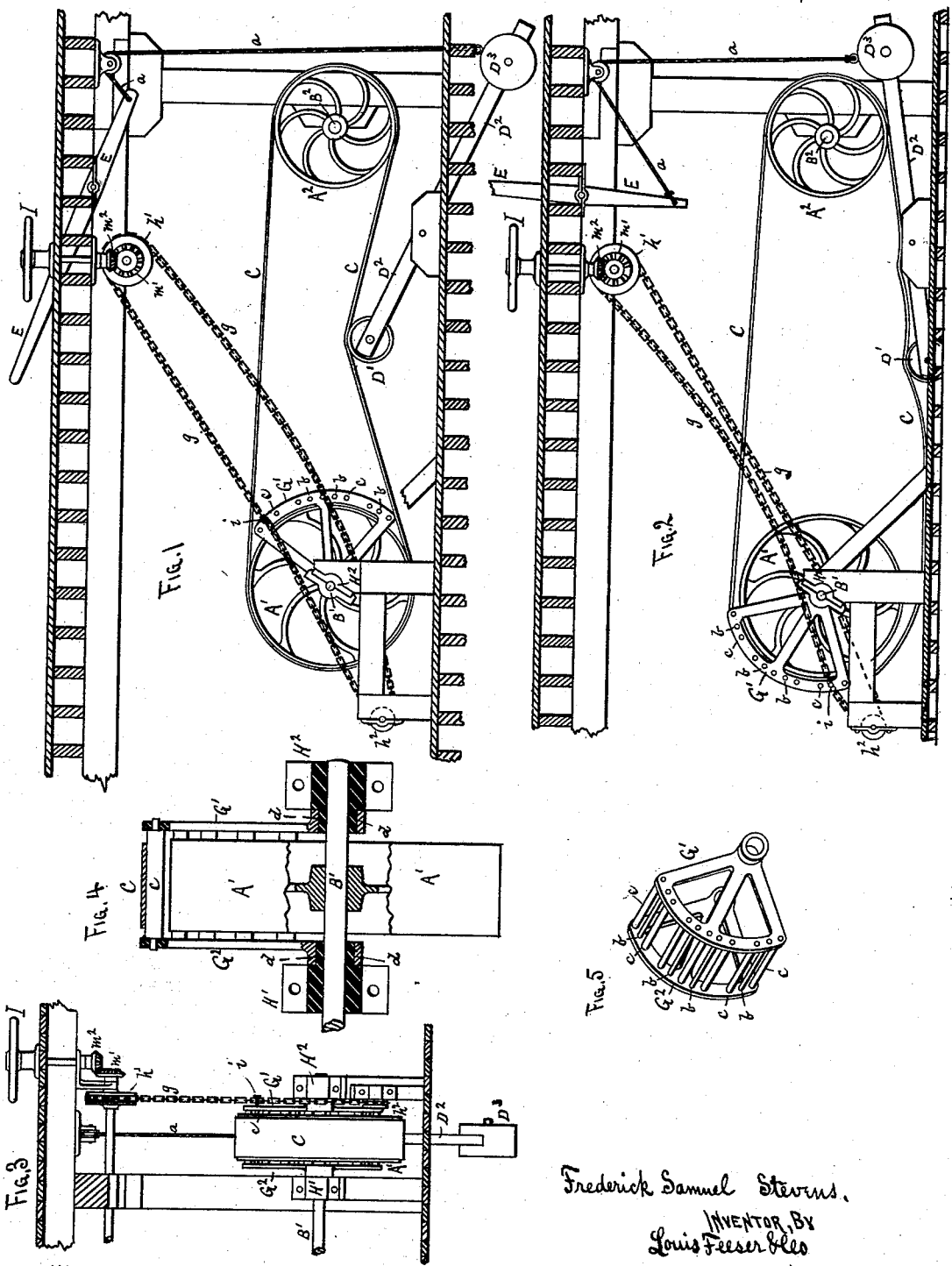

FREDERICK S. STEVENS, OF MINNEAPOLIS, MINNESOTA.

BELT-SHIFTER.

SPECIFICATION forming part of Letters Patent No. 268,051, dated November 28, 1882.

Application filed May 29, 1882. (No model.)

*To all whom it may concern:*

Be it known that I, FREDERICK SAMUEL STEVENS, a citizen of the United States, and a resident of Minneapolis, in the county of Hennepin and State of Minnesota, have made certain new and useful Improvements in Belt-Shifters, of which the following is a specification.

This invention relates to apparatus for shifting belts in stopping and starting machinery; and it consists in the construction and arrangement of parts, as hereinafter described and specifically claimed.

In the drawings, Figure 1 is a side view with the belt in place upon the shafting as it appears when running. Fig. 2 is a similar view, showing the relative positions of the parts when the belt is thrown out of tension and removed by the shifter-frame from contact with the driving-pulley. Fig. 3 is an end view of Fig. 1. Fig. 4 is an enlarged cross-section through the segmental shifter-frame and driving-pulley and its journals. Fig. 5 is a detached perspective view of the segmental shifter-frame.

This apparatus is to be used in establishments where belting is employed to convey power for the purpose of removing the belt from the driving-pulley when the machinery driven thereby is to be stopped.

$A'$ is the main driving-pulley, mounted upon the main driving-shaft $B'$, and $A^2$ is a counter-pulley or driven pulley, mounted upon a counter-shaft or driven shaft, $B^2$, and $C$ is a belt connecting them and held in contact therewith by a tightener, $D'$. This tightener may be arranged in any suitable manner; but for the purpose of illustration I have shown it mounted in a frame, $D^2$, and provided with a weight, $D^3$, to hold it up against the belt, and with a cord or chain, $a$, and lever $E$, to raise the weighted end of the frame $D^2$ to release the belt, as shown in Fig. 2.

Swiveled upon the shaft $B'$, or upon bearings surrounding said shaft, upon both sides of the driving-pulley $A'$, are two segmental frames, $G'$ $G^2$, their radii being longer than the radius of the pulley, so that the outer rims of the segmental frames project beyond the face of the pulley. Connecting these projecting outer rims of the segmental frames are cross rods or bars $b$, extending across the face of the pulley, but not touching it, so that the segmental frames will be free to revolve around the pulley, but will not touch it. The space between the sides $G'$ $G^2$, outside the face of the pulley $A'$, will also be occupied at intervals with friction-rollers $c$, as shown. As before stated, the segmental frames $G'$ $G^2$ will be journaled directly upon the shaft $B'$, or upon stationary collars $d$ upon the boxes $H'$ $H^2$ of the shaft, or upon auxiliary plates secured to the frame-work and surrounding the shaft, the object of swiveling them separately from the shaft being to prevent constant friction therein by the revolving of the shaft, while at the same time by oscillating about the shaft as a center the cross-bars $b$ and rollers $c$ will never come in contact with the pulley. The segmental frames $G'$ $G^2$ will be small enough to rest between the sides of the belt $C$, as shown in Fig. 1, and not touch it or interfere with its operation when the frames are at rest.

When the machinery is to be stopped it is only necessary to release the tightener $D'$, as shown in Fig. 2; but the belt would lie loosely upon the revolving pulley $A'$, and unless it were lifted up off from the pulley would soon wear through. To lift this belt up off from the revolving pulley when slackened up by the tightener is the office of the segmental frame $G'$ $G^2$, which it does when thrown over, as shown in Fig. 2, and, being free from the pulley, the latter will revolve beneath it without affecting it or the belt.

The segmental frames may be operated in any suitable manner; but for the purpose of illustration I have shown them provided with an endless chain, $g$, running over pulleys or sheaves $h'$ $h^2$, one forward of and the other in the rear of the segmental frame, and providing one of the sheaves with gear-wheels $m'$ $m^2$ and hand-wheel $I$, so that by turning the hand-wheel and gears in one direction the chain will be run one way, and by reversing the motion the chain will be run in the opposite direction. It will thus be seen that if one side of the chain be attached at $i$ to the segmental shipper-frame the frame may be thrown up or down by revolving the hand-wheel forward or backward. By this arrangement the shipper mechanism occupies but little more space than the actual width of the driving-pulley, while in the ordinary arrangement of loose and tight pulleys at least twice as much space in width will be required as is actually used at one time. The wear on the belt is also very much lessened by this arrangement, as the friction is greatly reduced. In small belts the rollers $c$ will not be required; but with large belts they render the action of the segmental frames more easy.

What I claim as new is—

1. A pulley, a belt adapted to run over said pulley, and a segmental frame or frames adapted to be oscillated about said pulley to lift said belt up off from said pulley, substantially as set forth.

2. A pulley having inwardly-projecting collars surrounding its shaft upon both sides thereof, a segmental frame or frames swiveled upon said collars, and a belt adapted to run upon said pulley, combined and operating substantially as and for the purpose set forth.

3. The combination of a pulley, $B'$, boxes $H'$ $H'$, collars $d$, segmental frames $G'$ $G^2$, cross rods or bars $b$, rollers $c$, and belt C, substantially as set forth.

4. The combination of the pulleys $A'$ $A^2$, belt C, segmental frame $G'$ $G^2$, and tightener $D'$, substantially as set forth.

In testimony whereof I have hereunto set my hand in the presence of two subscribing witnesses.

FREDERICK SAMUEL STEVENS.

Witnesses:
P. F. ELLIOT,
E. M. MORELAND.